(12) United States Patent
Haynes et al.

(10) Patent No.: US 8,280,834 B2
(45) Date of Patent: Oct. 2, 2012

(54) SYSTEMS AND METHODS INVOLVING RULE ENGINES

(75) Inventors: Leon Ericson Haynes, Virginia Beach, VA (US); Charles Brian Singleton, Newport News, VA (US); Timothy Walker Stoke, Virginia Beach, VA (US); Mathew Ryan Sullivan, Norfolk, VA (US)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 12/268,002

(22) Filed: Nov. 10, 2008

(65) Prior Publication Data
US 2010/0121805 A1 May 13, 2010

(51) Int. Cl.
*G06F 17/00* (2006.01)
(52) U.S. Cl. ........................................... 706/47
(58) Field of Classification Search .......................... None
See application file for complete search history.

(56) References Cited

U.S. PATENT DOCUMENTS

| | | | |
|---|---|---|---|
| 5,692,186 A | * | 11/1997 | Fukuoka et al. ............... 1/1 |
| 6,532,412 B2 | | 3/2003 | Adibhatla et al. |
| 6,760,689 B2 | | 7/2004 | Follin et al. |

OTHER PUBLICATIONS

Hall, "Rule Chaining in Fuzzy Expert Systems", 2001, IEEE, pp. 1-19.*

* cited by examiner

*Primary Examiner* — David R Vincent
*Assistant Examiner* — Paulinho E Smith
(74) *Attorney, Agent, or Firm* — Cantor Colburn LLP

(57) ABSTRACT

A method for monitoring a system includes receiving a first data asset from the system, receiving a configuration file, determining whether the configuration file includes the first data asset and an associated first rule engine logic identifier, and running a first rule engine associated with the first rule engine logic identifier responsive to determining that the configuration file includes the first data asset and the associated first rule engine logic identifier. The method also includes sending the first data asset to the first rule engine, receiving a first result from the first rule engine, and sending the first result to a display for presentation to a user.

20 Claims, 5 Drawing Sheets

US 8,280,834 B2

SYSTEMS AND METHODS INVOLVING RULE ENGINES

BACKGROUND OF THE INVENTION

The subject matter disclosed herein relates to rule engine logic in power systems.

Power systems use logic to control the systems. The power systems send data (assets) including, for example, sensor readings and system status data to a control system that receives the data and performs logic functions. The results of the logic functions are sent to a user via a display, or are used to control the power system.

Previous control system designs may have been difficult to modify; using cumbersome coding techniques to add or modify logic functions. A method and system for controlling a power system that may be easily modified is desired.

BRIEF DESCRIPTION OF THE INVENTION

According to one aspect of the invention, a method for monitoring a system comprising, receiving a first data asset from the system, receiving a configuration file, determining whether the configuration file includes the first data asset and an associated first rule engine logic identifier, running a first rule engine associated with the first rule engine logic identifier responsive to determining that the configuration file includes the first data asset and the associated first rule engine logic identifier, sending the first data asset to the first rule engine, receiving a first result from the first rule engine, and sending the first result to a display for presentation to a user.

According to another aspect of the invention, a method for monitoring a system comprising, receiving a first data asset from the system, receiving a configuration file, determining whether the configuration file includes the first data asset and an associated first rule engine logic identifier, running a first rule engine associated with the first rule engine logic identifier responsive to determining that the configuration file includes the first data asset and the associated first rule engine logic identifier, sending the first data asset to the first rule engine, receiving a first result and a first confidence value associated with the first result from the first rule engine, determining whether the configuration file includes the first result and the first confidence value and an instruction to output the first result and the first confidence value, and sending the first result and the first confidence value to the display for presentation to the user responsive to determining that the configuration file includes the first result and the first confidence value and an instruction to output the first result and the first confidence value.

According to yet another aspect of the invention, a control system comprising, display, a memory, and a processor operative to receive a first data asset, receive a configuration file from the memory, determine whether the configuration file includes the first data asset and an associated first rule engine logic identifier, run a first rule engine associated with the first rule engine logic identifier responsive to determining that the configuration file includes the first data asset and the associated first rule engine logic identifier, send the first data asset to the first rule engine, receive a first result from the first rule engine, and send the first result to the display for presentation to a user.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Power systems may include any power system type such as, for example, an electrical or mechanical power system or associated equipment including gas or steam turbine systems. A power system in operation sends data (assets) to a control system that uses logic to determine outputs such as, for example, sensor reading output to a user, alarms, and control signals to the system.

Figure 1:
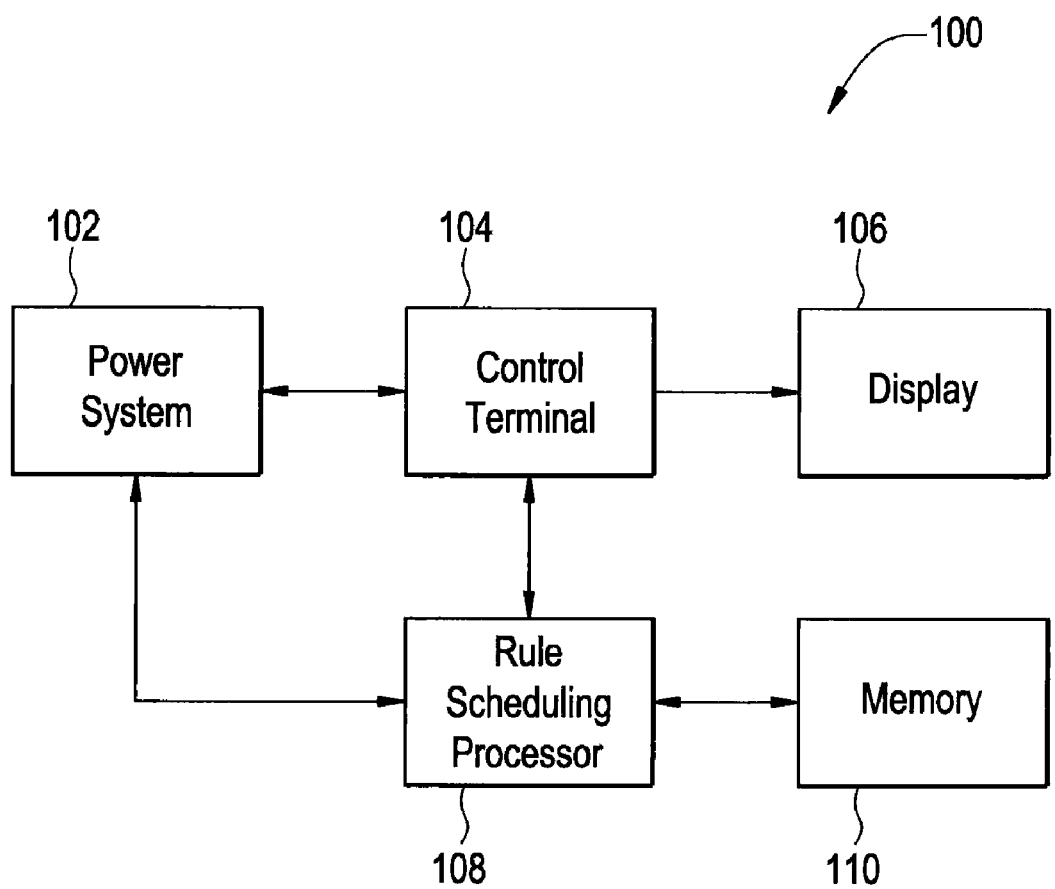
FIG. 1 is an exemplary embodiment of a system for controlling a power system.

FIG. 1 illustrates an exemplary embodiment of a system for controlling a power system. The system 100 includes a rule scheduling processor 108 communicatively linked to a power system 102, a control terminal 104, and a memory 110. The control terminal 104 may be communicatively linked to a display. The power system 102 may include any power system type such as, for example, an electrical or mechanical power system or associated equipment including gas or steam turbine systems. The rule scheduling processor 108 may include any type of logic device. The control terminal 104, may in some embodiments include features of the rule scheduling processor 108, and is operative to receive inputs from the power system 102 and the rule scheduling processor 108, and output control signals to the power system 102. Status of the power system 102 and data from the rule scheduling processor and the control terminal may be output to the display 106.

Figure 2:
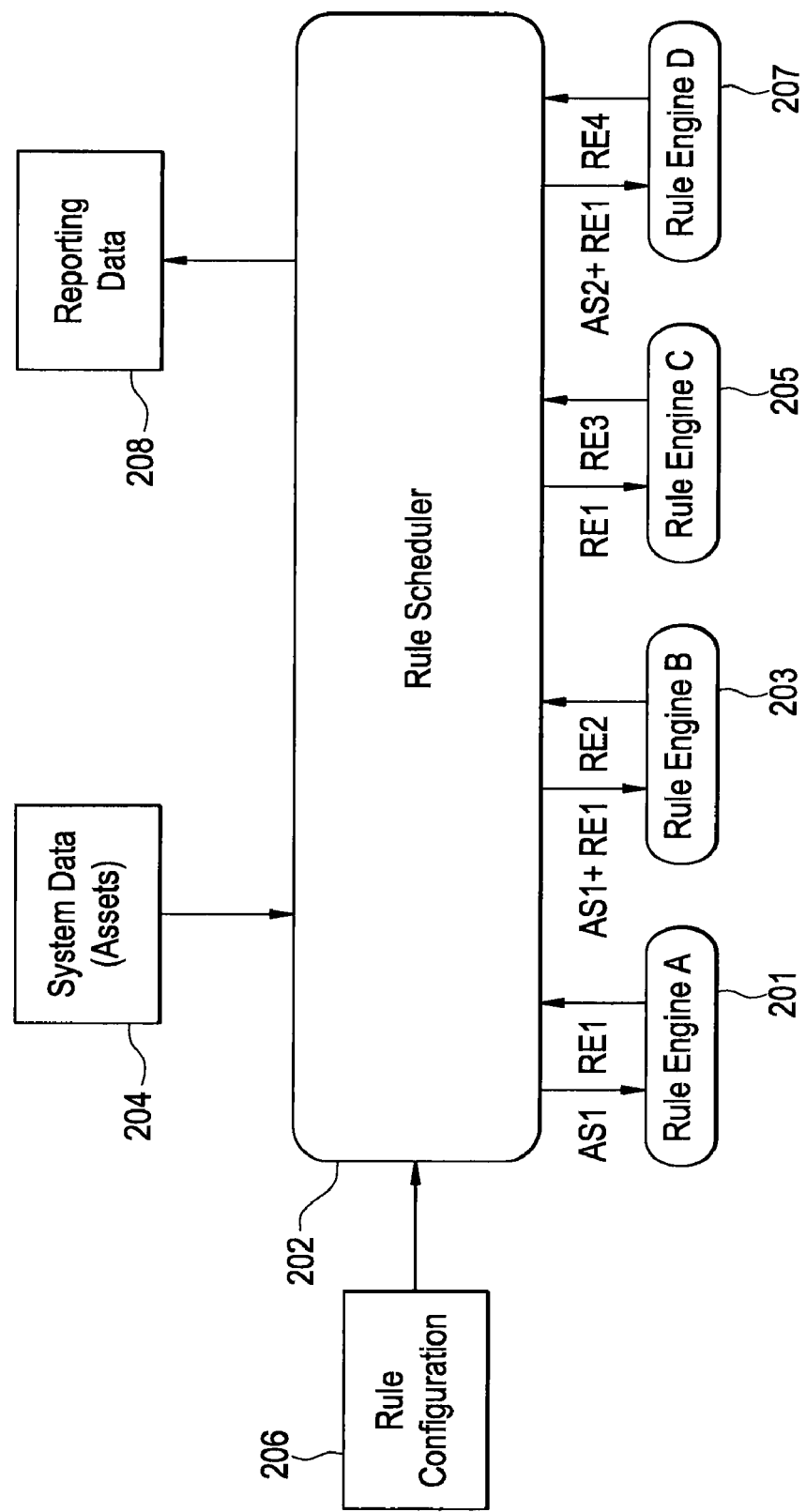
FIG. 2 is a block diagram illustrating an exemplary embodiment of the data flow in the rule scheduling processor of FIG. 1.

FIG. 2 is a block diagram illustrating an exemplary embodiment of the data flow in the rule scheduling processor 108 (of FIG. 1). FIG. 2 includes a rule scheduler 202 that receives system data (assets) 204 from the power system 102 (of FIG. 1) and a rule configuration file 206. The rule scheduler outputs reporting data 208 to the power system 102 and the control terminal 104. In operation, the rule scheduler 202 receives assets and uses the rule configuration file to associate the assets with identifiers of the rule engines. The rule engines (201, 203, 205, and 207) are executable files having unique identifiers, and perform logic functions. The rule engines may be stored in memory addresses accessible by the rule scheduling processor 108. The configuration file includes instructions associated with assets. For example, if an asset AS1 is received, the rule scheduler 202 receives the rule configuration file 206 and determines whether the asset AS1 is associated with a rule engine. In the illustrated example, the asset AS1 is associated with the rule engine A 201 in the rule configuration file 206. The rule configuration file 206 includes an address identifying the rule engine A 201. The rule scheduler 202 directs the rule engine A 201 to run, and sends the asset AS1 to the rule engine A 201. Once the rule engine A 201 performs a logic function of the AS1, the rule engine A 201 sends the result RE1 to the rule scheduler 202. When the rule scheduler 202 receives the result RE1, the rule scheduler uses the rule configuration file 206 to determine an action associated with the result RE1. The rule scheduler 202 may use the result RE1 to initiate additional rule engines and may determine that RE1 is to be output as data reporting 208.

Some rule engines may be associated with combinations of assets and results, for example, rule engine D 207 performs logic associated with an asset A2 and the result RE1. When asset A1 is received and processed with the rule engine A 201, the result R1 is received by the rule scheduler 202. When the rule scheduler receives the result R1 and the asset AS2, the result R1 and the asset AS2 are associated with the rule engine D 207 in the configuration file 206. The rule scheduler 202 then initiates the rule engine D 207 and sends the result R1 and the asset AS2 to the rule engine D 207 for logic processing, and receives the result RE4 from the rule engine D 207.

FIG. 2 illustrates the flexibility of the system. For example, if a technician adds a rule engine to the system, the rule engine may be added to a database that includes a plurality of rule engines. The technician may then update the rule configuration file 206 to associate a particular asset or result with the new rule engine address and the routing of the result from the new rule engine. Once the asset or result is received by the rule scheduler, the updated rule configuration file 206 provides the rule scheduler 202 with the instructions for routing the associated assets and results. Thus, to add or change the functionality of the system, a technician may simply add or modify a rule engine and update the rule configuration file instructions associated with the rule engine, assets, and results. The architecture of the system including the basic operation of the rule scheduler 202 may be left unchanged. This system increases the flexibility and simplifies modification of the logic functions.

Figure 3:
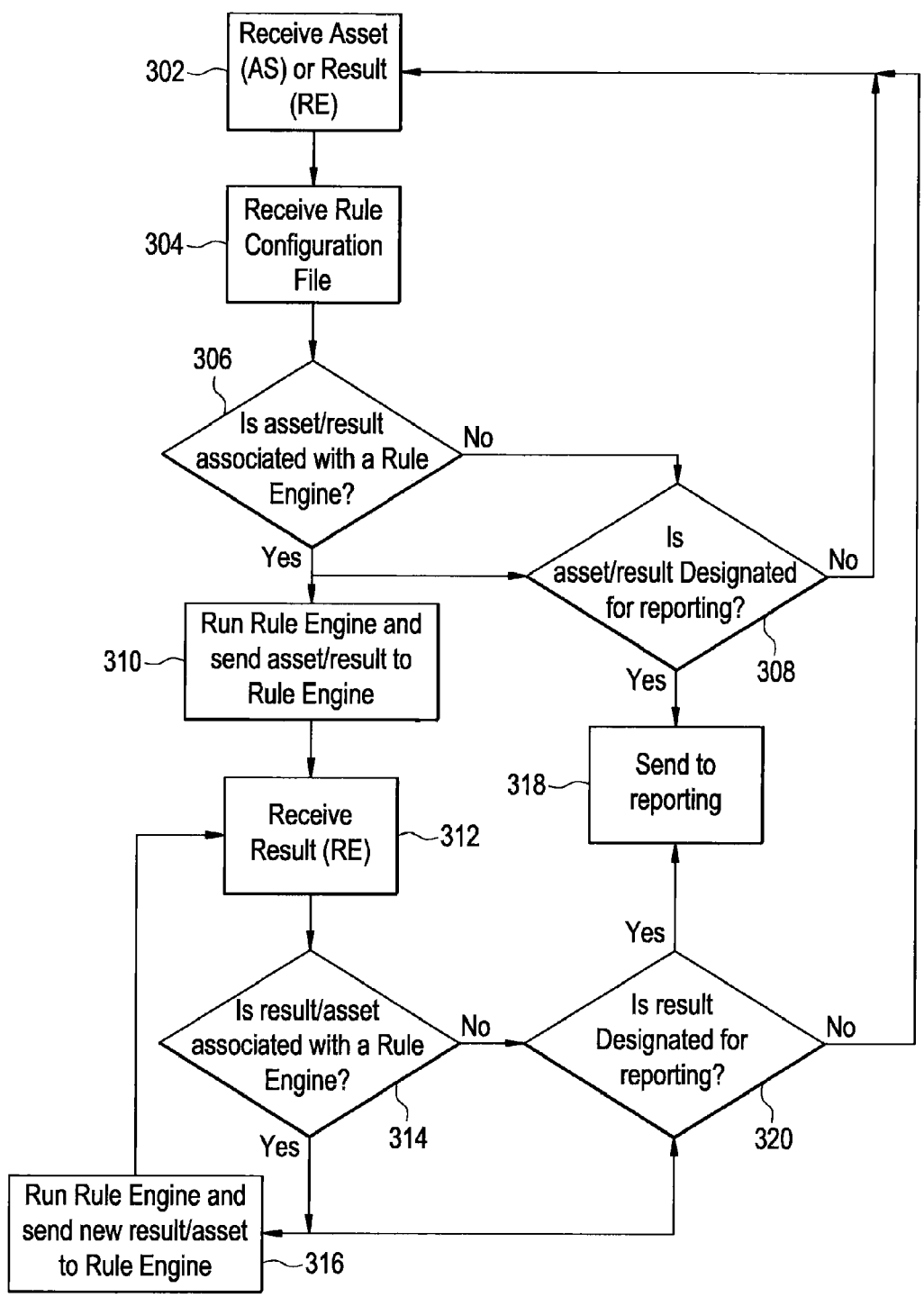
FIG. 3 is a block diagram illustrating an exemplary embodiment of the operation of the system of FIG. 2.

FIG. 3 is a block diagram illustrating an exemplary embodiment of the operation of the system 1 00. An asset or result is received by the rule scheduler 202 (of FIG. 2) in block 302. In block 304, the rule configuration file 206 is received. In block 306 the rule scheduler 202 determines whether the asset or result is associated with a rule engine in the rule configuration file 206. In block 308, if the asset or result is not associated with a rule engine, the rule scheduler determines whether the asset or result is designated for reporting in the rule configuration file 206. If the asset or result is designated for reporting, the asset or result is sent to reporting in block 318. If the asset or result is associated with a rule engine, the asset or result may be reported via block 308, and the rule engine is initiated and the asset or result is sent to the rule engine in block 310. Once the rule engine performs the logic associated with the rule engine, the result is sent to and received by the rule scheduler 202 in block 312. In block 314, the rule scheduler 202 determines whether the received result (and other assets) is associated with another rule engine. If no, the rule scheduler 202 determines whether the received result is designated for reporting in block 320. If the received result is designated for reporting, the received result is sent to reporting in block 318. In block 316, the rule scheduler 202 determines if the asset or result is associated with a rule engine. If yes, the rule engine is initiated and the asset and/or result is sent to the rule engine in block 316.

The reporting data 208 may be used to present the data to a user via the display 106 (of FIG. 1), and may be sent to the power system 102 as control signals via the control terminal 104 or directly to the power system 102 for controlling the power system 102 or initiating alarm sequences.

Figure 4:
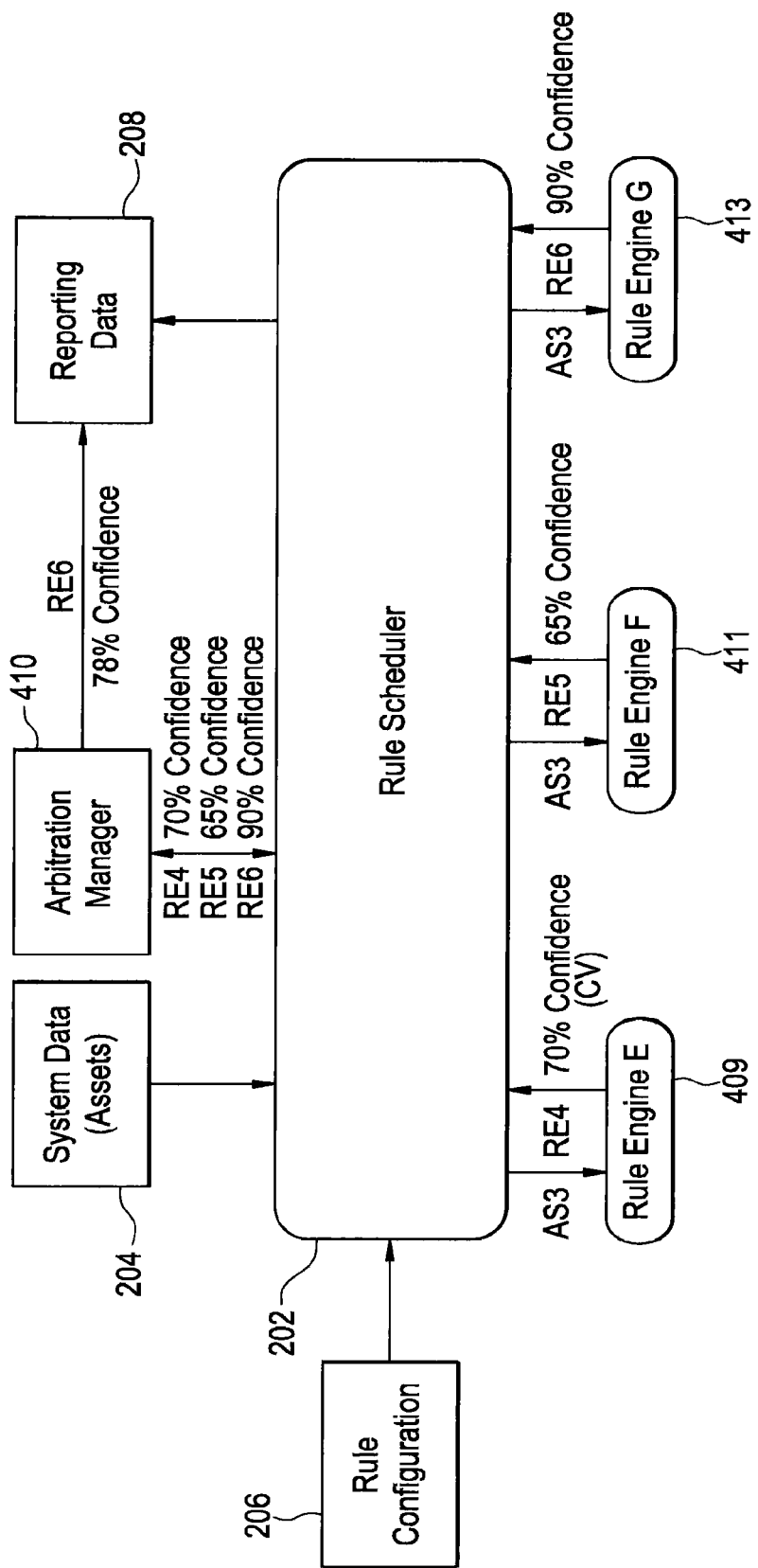
FIG. 4 is a block diagram illustrating an alternate exemplary embodiment of the data flow in the rule scheduling processor of FIG. 1.

FIG. 4 is a block diagram illustrating an alternate exemplary embodiment of the data flow in the rule scheduling processor 108 (of FIG. 1) that includes data arbitration features. The data arbitration features may be included in the embodiment described above in FIG. 2 such that embodiments include the features of FIG. 2 and the arbitration features of FIG. 4. Referring to FIG. 4, the rule scheduler 202 operates in a similar manner as described above, and may include rule engines (409, 411, and 413) that output results and result confidence values and an arbitration manager 410 that arbitrates the results and result confidence values and outputs an arbitrated result and confidence value to the data reporting 208. The confidence values represent a probability that the result is accurate. For example, a 90% confidence level indicates that a result is likely to be more accurate than a 60% confidence level. The rules engines (409, 411, and 413) may perform logic functions on a similar asset (AS3) and output different results. The logic functions may use different logic processes such as, for example, fuzzy logic, generic algorithms, and numerical regression. Since different logic processes may output results having different confidence values associated with the result, it may be desirable to arbitrate the results from the different logic processes to output a final result with an associated confidence value.

Figure 5:
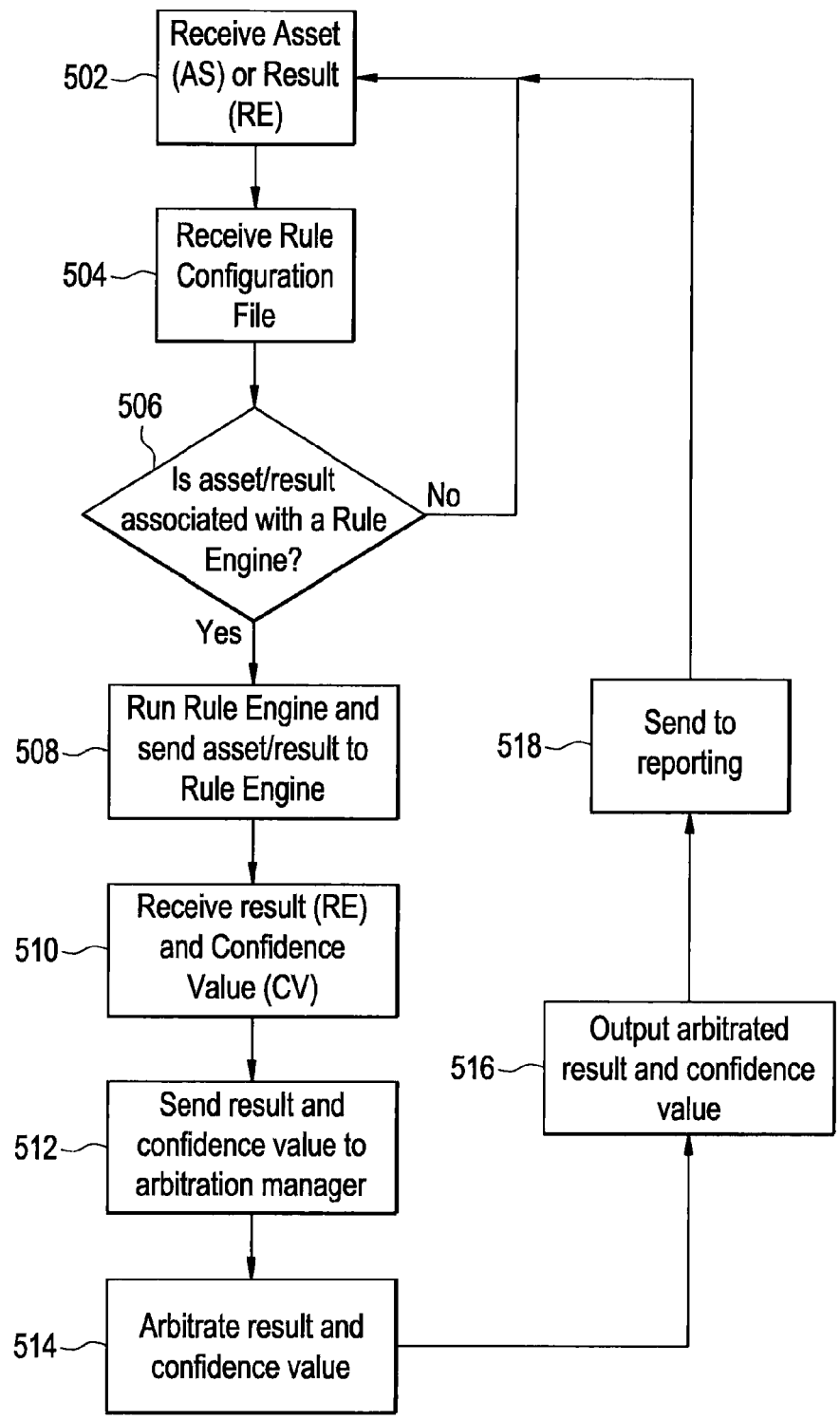
FIG. 5 is a block diagram illustrating an exemplary embodiment of the operation of the system of FIG. 4.

FIG. 5 is a block diagram illustrating an exemplary embodiment of the operation of the arbitration feature of FIG. 4. For simplicity, FIG. 4 includes the logic associated with the arbitration feature, and may include logic functions included in FIG. 3, for example additional routing of reporting assets and results, and routing of multiple assets and results. Referring to FIG. 4, an asset is received in block 502. In block 504, the configuration file is received. In block 506, it is determined whether the asset is associated with a rule engine. The rule engine is run and the asset is sent to the rule engine in block 508. In block 510 the result and confidence value is received from the rule engine. In block 512, the result and confidence value are sent to the arbitration manager 410 (of FIG. 4). The arbitration manager arbitrates the result and confidence values of the received results and confidence values in block 514, and outputs an arbitrated result and confidence value in block 516. The arbitrated result and confidence value are sent to reporting in block 518.

The arbitration manager 410 may receive numerous results and confidence values for arbitration. For example, referring to FIG. 4, the asset AS3 is sent to the rule engine E 409, the rule engine F 411, and the rule engine G 413. The rule engines perform logic and send results (RE4, RE5, and RE6) and associated confidence values (CV) to the rule scheduler 202. The rule scheduler sends the results (RE4, RE5, and RE6) and associated confidence values (CV) to the arbitration manager 410 that performs arbitration to determine an arbitrated result and confidence value. The arbitration manager 410 outputs the arbitrated result and confidence value (RE6, 78% confidence value). The arbitrated result and confidence value may be displayed to a user, or may be used for controlling the power system. The arbitrated result and confidence value give a user additional information regarding a result and allow a user to take action to control or maintain the associated systems more effectively.

The arbitration manager 410 may use a variety of arbitration algorithms. In one embodiment, the arbitration manager 410 receives a set of associated results and confidence values and determines which result has the highest confidence value. The result with the highest confidence value is sent to the rule scheduler 202 or the reporting data 208.

The arbitration manager 410 may also use a fuzzy logic algorithm to arbitrate results and confidence values. Fuzzy logic uses fuzzification, a fuzzy rule-base, and defuzzification. Associated results and confidence values are evaluated using a fuzzy rule set to determine the level of agreement of the results. The output from the fuzzy rule set is defuzzified as a weighted average. Arbitration manager 410 outputs a final result and associated confidence value that represents the accumulated evidence and weighted average of the arbitrated results and confidence values.

In alternate embodiments the arbitration manager 410 may receive arbitration logic associated with results from the rule configuration 206. A user may define arbitration logic associated with results that may include, for example, weighted averages of results, or other statistical analysis. The arbitration manager 401 receives the defined arbitration logic from the rule configuration 206 and performs the arbitration logic when the associated results and confidence values are received.

The technical effects and benefits of the systems and methods described above allow increased design flexibility and allow simple modification of the logic functions of the system while preserving the basic architecture of the system. Features of the described systems and methods allow arbitration of the results of logic functions and the confidence values associated with the results.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for monitoring a system comprising:
   receiving, in a rule scheduler, a first data asset from the system;
   receiving a configuration file, in the rule scheduler, the configuration file including instructions associated with data assets;
   determining with the rule scheduler, whether the configuration file includes the first data asset and an associated first rule engine logic identifier;
   running a first rule engine associated with the first rule engine logic identifier responsive to determining that the configuration file includes the first data asset and the associated first rule engine logic identifier;
   sending the first data asset to the first rule engine; and
   receiving a first result from the first rule engine.

2. The method of claim 1, wherein the method further comprises:
   determining whether the configuration file includes the first result and an associated second rule engine logic identifier;
   running a second rule engine associated with the second rule engine logic identifier responsive to determining that the configuration file includes the first result and the associated second rule engine logic identifier;
   sending the first result to the second rule engine; and
   receiving a second result from the second rule engine.

3. The method of claim 2, wherein the method further comprises:
   determining whether the configuration file includes the second result and an instruction to output the second result; and
   sending the second result to the display for presentation to the user responsive to determining that the configuration file includes the second result and an instruction to output the second result.

4. The method of claim 1, wherein the method further comprises:
   receiving a second data asset from the system;
   determining whether the configuration file includes the first result and the second data asset and an associated third rule engine logic identifier;
   running a third rule engine associated with the third rule engine logic identifier responsive to determining that the configuration file includes the first result and the second data asset and an associated third rule engine logic identifier;
   sending the first result and the second data asset to the third rule engine; and
   receiving a third result from the third rule engine.

5. The method of claim 1, wherein the method further comprises:
   converting the first result into a control signal for the system; and
   sending the control signal to the system.

6. A method for monitoring a system comprising:
   receiving a first data asset from the system;
   receiving a configuration file;
   determining whether the configuration file includes the first data asset and an associated first rule engine logic identifier;
   running a first rule engine associated with the first rule engine logic identifier responsive to determining that the configuration file includes the first data asset and the associated first rule engine logic identifier;
   sending the first data asset to the first rule engine;
   receiving a first result and a first confidence value associated with the first result from the first rule engine;
   determining whether the configuration file includes the first result and the first confidence value and an instruction to output the first result and the first confidence value; and
   sending the first result and the first confidence value to the display for presentation to the user responsive to determining that the configuration file includes the first result and the first confidence value and an instruction to output the first result and the first confidence value.

7. The method of claim 6, wherein the method further comprises:
   determining whether the configuration file includes the first data asset and an associated second rule engine logic identifier;
   running a second rule engine associated with the second rule engine logic identifier responsive to determining that the configuration file includes the first data asset and the associated second rule engine logic identifier;
   sending the second data asset to the second rule engine;
   receiving a second result and a second confidence value associated with the second result from the second rule engine;
   arbitrating the first result and the first confidence value associated with the first result and the second result and the second confidence value to define an arbitrated result and an arbitrated confidence value associated with the arbitrated result; and sending the arbitrated result and the arbitrated confidence value to a display for presentation to a user.

8. The method of claim 7, wherein the arbitrating is performed using fuzzy logic.

9. The method of claim 7, wherein the defined arbitrated result is the result having the highest associated confidence value, and the arbitrated confidence value is the highest confidence value.

10. The method of claim 7, wherein the method further comprises:
   converting the arbitrated result into a control signal for the system; and
   sending the control signal to the system.

11. The method of claim 7, wherein the method further comprises:
   determining whether the configuration file includes the second result and the second confidence value and an instruction to output the second result and the second confidence value; and
   sending the second result and the second confidence value to the display for presentation to the user responsive to determining that the configuration file includes the second result and the second confidence value and an instruction to output the second result and the second confidence value.

12. A control system comprising:
   a display;
   a memory; and
   a processor operative to perform rule scheduling, and receive a first data asset, receive a configuration file from the memory the configuration file including instructions associated with data assets, perform rule scheduling by determining whether the configuration file includes the first data asset and an associated first rule engine logic identifier, run a first rule engine associated with the first rule engine logic identifier responsive to determining that the configuration file includes the first data asset and the associated first rule engine logic identifier, send the first data asset to the first rule engine, receive a first result from the first rule engine, and send the first result to the display for presentation to a user.

13. The system of claim 12, wherein the processor is further operative to determine whether the configuration file includes the first result and an associated second rule engine logic identifier, run a second rule engine associated with the second rule engine logic identifier responsive to determining that the configuration file includes the first result and the associated second rule engine logic identifier, send the first result to the second rule engine, and receive a second result from the second rule engine.

14. The system of claim 13, wherein the processor is further operative to determine whether the configuration file includes the second result and an instruction to output the second result, and send the second result to the display for presentation to the user responsive to determining that the configuration file includes the second result and an instruction to output the second result.

15. The system of claim 12, wherein the processor is further operative to receive a second data asset from the system, determine whether the configuration file includes the first result and the second data asset and an associated third rule engine logic identifier, run a third rule engine associated with the third rule engine logic identifier responsive to determining that the configuration file includes the first result and the second data asset and an associated third rule engine logic identifier, send the first result and the second data asset to the third rule engine, and receive a third result from the third rule engine.

16. The system of claim 12, wherein the processor is further operative to convert the first result into a control signal for the system, and send the control signal to the system.

17. The system of claim 12, wherein the processor is further operative to receive a first confidence value associated with the first result from the first rule engine, determine whether the configuration file includes the first result and the first confidence value and an instruction to output the first result and the first confidence value, and send the first result and the first confidence value to the display for presentation to the user responsive to determining that the configuration file includes the first result and the first confidence value and an instruction to output the first result and the first confidence value.

18. The system of claim 13, wherein the processor is further operative to receive a second confidence value associated with the second result from the second rule engine, arbitrate the first result and the first confidence value associated with the first result and the second result and the second confidence value to define an arbitrated result and an arbitrated confidence value associated with the arbitrated result, and send the arbitrated result and the arbitrated confidence value to a display for presentation to a user.

19. The system of claim 18, wherein the defined arbitrated result is the result having the highest associated confidence value, and the arbitrated confidence value is the highest confidence value.

20. The system of claim 18, wherein the processor is further operative to arbitrate the first result and the first confidence value associated with the first result and the second result and the second confidence value using fuzzy logic.

* * * * *